United States Patent Office

3,655,813
Patented Apr. 11, 1972

3,655,813
CONTINUOUS ALKYLATION PROCESS
Francis W. Kirsch, Wayne, John D. Potts, Springfield, and David S. Barmby, Media, Pa., assignors to Sun Oil Company, Philadelphia, Pa.
Continuation-in-part of application Ser. No. 716,190, Mar. 26, 1968, which is a continuation-in-part of application Ser. No. 581,129, Aug. 25, 1966. This application June 5, 1969, Ser. No. 830,687
Int. Cl. C07c 3/52
U.S. Cl. 260—683.43
11 Claims

ABSTRACT OF THE DISCLOSURE

Olefin-paraffin alkylate is continuously produced by contacting in the liquid phase a $C_3$–$C_9$ monoolefin with a $C_4$–$C_6$ isoparaffin in the presence of a substantially anhydrous crystalline alumino-silicate zeolite, continuously feeding monoolefin and isoparaffin and withdrawing reaction product at the same rate, while allowing said catalyst to remain intact within the system for a period less than about 60 hours before continuously feeding active catalyst and withdrawing aged catalyst from the system at the same rate. The aged catalyst is then regenerated by subjecting it to a regenerant selected from the group consisting of air, an inert gas, inert sorbate, or mixtures thereof, and is ultimately reactivated.

CROSS-REFERENCE TO RELATED APPLICATIONS

Figure 1:
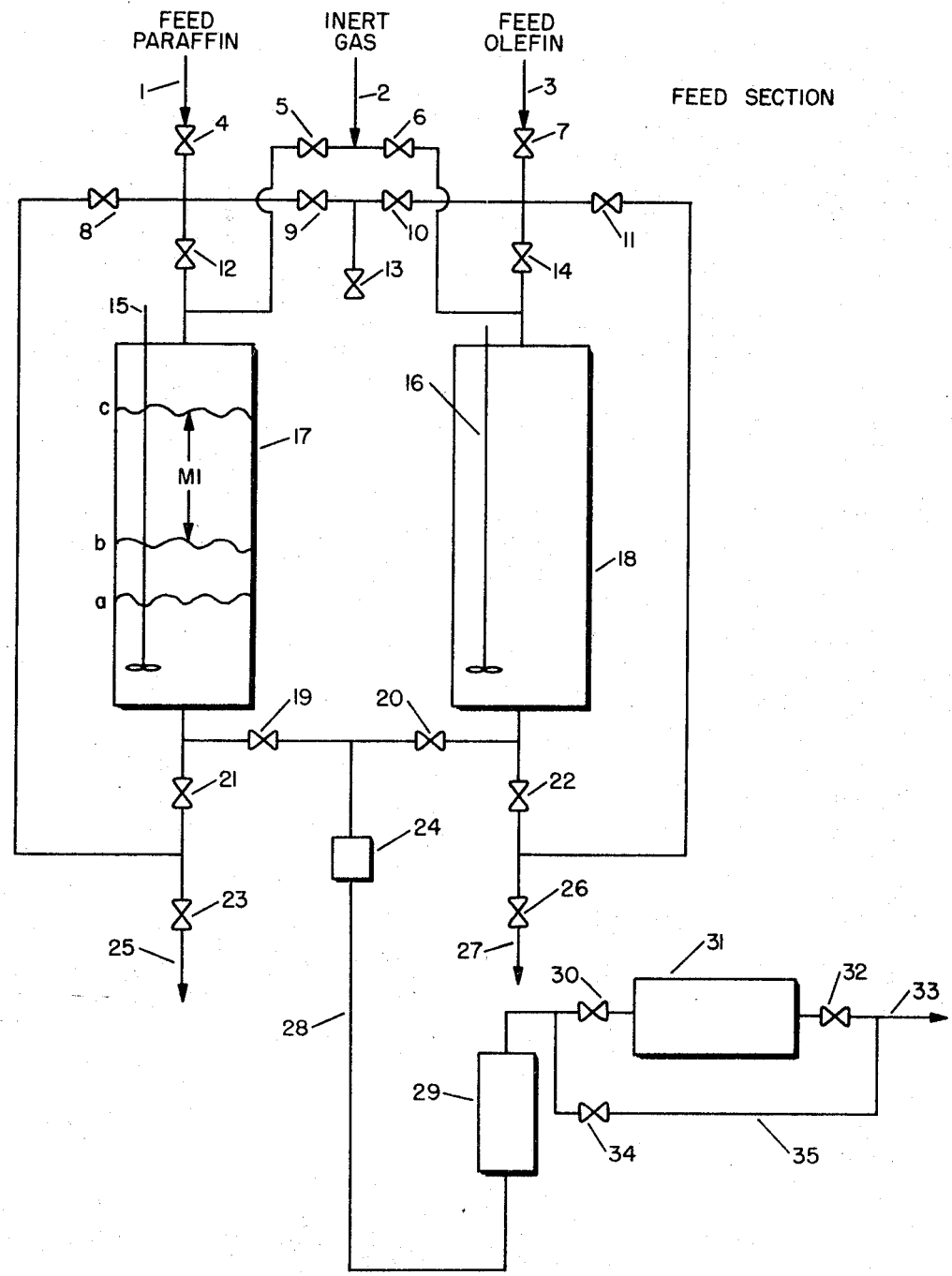

This application is a continuation-in-part of Ser. No. 716,190 filed Mar. 26, 1968, which is in turn a continuation-in-part of Ser. No. 581,129 filed Aug. 25, 1966, now abandoned, by the present inventors and assigned to Sun Oil Company, to whom the present application is also assigned.

This application is also copending with Ser. No. 715,998 filed Mar. 26, 1968, Ser. No. 749,714 filed Aug. 2, 1968, both by the present inventors; and Ser. No. 718,908 filed Mar. 26, 1968, Ser. No. 750,432 filed Aug. 2, 1968, and Ser. No. 749,739 filed Aug. 2, 1968, all by Ronald D. Bushick and assigned to Sun Oil Company; said applications being incorporated herein by reference.

This invention relates to the continuous production of normally liquid saturated hydrocarbons useful in gasoline blending by reacting isoparaffins with olefins in liquid phase in the presence of a substantially anhydrous crystalline alumino-silicate zeolite. More particularly, the invention relates to a continuous process for the preparation of an alkylate which comprises contacting a $C_3$–$C_9$ monoolefin with a $C_4$–$C_6$ isoparaffin in the presence of a substantially anhydrous crystalline alumino-silicate zeolite, at a temperature below the critical temperature of the lowest boiling hydrocarbon reactant and at a pressure such that the reactants are at least partially in the liquid phase.

Heretofore, many attempts have been made in the petroleum industry to effect a commercially successful paraleum industry to effect a commercially successful paraffin-olefin alkylation process. The most widely used process for obtaining the highly desired components for gasoline employs strong acid catalysts such as $H_2SO_4$ or HF. These catalysts have proven very successful in producing alkylate; however, their use creates potentially hazardous environments for workmen, necessitating strict safety procedures. In the most recent development, alkylation processes employing crystalline, alumino-silicate catalysts have been reported. Examples of such references include U.S. Pats. Nos. 2,904,607, 3,251,902, and 3,308,069. These references disclose olefin alkylation with both aromatics and isoparaffins.

As is hereinafter disclosed, it has now been discovered that a successful continuous operation of an alkylation process can take place which provides a superior product of highly saturated alkylate from $C_3$–$C_9$ monoolefins and $C_4$–$C_6$ isoparaffins and which provides a mode of catalyst regeneration for use in the continuous process. The alklation process employs a crystalline alumino-silicate zeolite catalyst with a large number of acid sites of sufficient strength to provide for hydride transfer. The process conditions are such as to also favor hydride transfer since the olefins are introduced to the reactor in the liquid phase and preferably in admixture with a $C_4$–$C_6$ isoparaffin, and the olefin feed is controlled such that the unreacted olefin in the reaction mixture is preferably maintained at less than 12 mole percent, and most preferably less than 7 mole percent, based on the total paraffin content of the reaction mixture. In order to insure an upper limit on the unreacted olefin present in the reaction mixture, it is necessary to either periodically meter the reactor contents and vary the feed based on the results thereof or maintain a sufficiently high paraffin to olefin feed ratio to prevent such accumulation. Generally a paraffin to olefin molar ratio of at least 15 to 1, and preferably 30 to 1, will suffice for the purpose of the instant invention.

As previously mentioned, favorable alkylation conditions involve temperatures below the critical temperature of the lowest boiling hydrocarbon reactant; generally temperatures in the range of about 25° to 200° C. are operable. For example, the preferable range for isobutane-butene alkylation is from 50° to 100° C. Also, as aforenoted, sufficient pressure is maintained in the reactor so that a substantial part of each reactant is in the liquid phase, thus assisting in the proper contact of the feeds. Generally pressures in the range of about 150 to 450 p.s.i. are sufficient, with the preferred range being about 250 to 350 p.s.i.

Preferably, there is also present in the reaction mixture a halide adjuvant containing fluorine, chlorine, or bromine which tends to improve the yield and selectivity at the preferred reaction conditions by promoting carbonium ion reactions. Although any adjuvant which promotes carbonium ions is useful in the present invention, the preferred compounds are those organic or inorganic halides which contain only hydrogen, carbon, bromine, fluorine, or chlorine atoms. Examples of such compounds include tertiary butyl chloride, carbon tetrachloride, HF, HBr, and HCl. The halide adjuvants are generally present in the reaction mixture at a level of from $1 \times 10^{-5}$ to 1 mole per mole of $C_4$–$C_6$ isoparaffin reactant.

It is the primary desire of the disclosed invention to maximize the production of saturated hydrocarbons, particularly the trimethylpentanes (TMP) since as is well known in the petroleum industry these compounds have desirable antiknock characteristics. With $C_4$ olefins and isobutane, we desire to maximize the percentage yield of $C_5^+$ saturates and the yield of trimethylpentanes, based on the weight of olefin charged. It should be noted that true alkylation produces saturated hydrocarbons, whereas unsaturated reaction products are indicative of olefin homopolymerization.

It has been found that with isobutane and butene-2 feeds, even when secondary reactions have occurred to some extent, the molecular ratio of trimethylpentanes/dimethylhexanes (TMP/$DMH_x$) in the reaction mixture indicates the relative degree to which the primary reaction was alkylation or polymerization. That is, dimethylhexanes arise from olefin dimerization followed by hydride transfer, whereas trimethylpentane formation is largely dependent upon paraffin-olefin combination to form a carbonium ion species followed by hydride abstraction from the isobutane. Therefore, the higher the ratio TMP/DMH$_x$, the greater the effect of alkylation reactions in contrast to olefin homopolymerization.

As a further consideration in the operation of our continuous process, it has been found that although the alkylation reaction proceeds immediately, in order to obtain a steady high percentage yield of alkylate in the magnitude of at least 100% by weight alkylate per weight of olefin charged, a period of time corresponding to a buildup of carbonium ions must be effected. For example, in a fully-continuous process wherein the reactor is initially brought to a desired operating liquid level (generally 75% of reactor volume) with isoparaffin and catalyst and continuous introduction of reactants and withdrawal of a product stream is begun immediately at equal rates such as to maintain the hereinafter discussed mean residence time, then the time lapse before a steady yield of at least 100% alkylate per weight of olefin charged is obtained is about 6 to 12 hours.

The rate at which the feed is introduced into the reactor and, correspondingly, the product stream withdrawn therefrom since we desire to maintain a constant volume is a function of the mean residence time of the reaction mixture in contact with the catalyst. Herein the mean residence time is meant to signify the mean time in which a unit weight of hydrocarbon is in contact with a unit weight of catalyst. For the instant process, the mean residence time should be in the range of from 0.05 to 0.5 hour per (gram of hydrocarbon per gram of catalyst), and more preferably 0.1 to 0.4 hour.

An essential feature in securing a high production of saturated hydrocarbon is the proper selection of a catalyst. The catalysts of our process are those substantially anhydrous acidic crystalline alumino-silicate zeolites which in hydrated form are chemically characterized by the empirical formula $M_x(AlO_2)_x(SiO_2)_y \cdot (H_2O)_z$, where M is H$^+$ and/or an equivalent valence of metal cations and $x$, $y$, and $z$ are integers, the ratio $x:y$ being usually, but not necessarily, from 1.0 to 0.2. A 10% aqueous suspension of the acidic zeolite catalyst will have a pH less than 7, and preferably less than 5. For our process we prefer that the critical pore diameter of the zeolite be at least large enough to permit adsorption of benzene. We also prefer those acidic zeolites which contain both H$^+$ and polyvalent metal cations, including metal cations in which part of the charge is balanced by oxide or hydroxyl groups, although catalysts having only H$^+$ or polyvalent metal hydroxides, e.g., Ce(OH)$^{2+}$ or Ce(OH)$_2^+$, are effective in catalyzing paraffin-olefin alkylation. The catalyst is present in the reaction mixture in the range of from about 5 to 15% by weight based on the weight of the reactor contents. Preferably, the catalyst is present as about 10% by weight.

These catalysts are normally prepared from alkali metal-containing zeolites (which in 10% aqueous suspension will have a pH greater than 7, and usually greater than 9) by ion-exchanging the alkali metal ions for H$^+$ and/or polyvalent metal cations. Hydrogen-ion or proton exchange can be effected by exchange from aqueous or nonaqueous medium with mineral acids, such as dilute aqueous HCl, or by exchange with solutions of acids and polyvalent metal ions, such as aqueous HNO$_3$ and Ce(NO$_3$)$_3$. For zeolites such as the faujasites which can be degraded by direct acid exchange, we prefer as our exchange media aqueous solutions containing, as at least one component, ammonium salts. Polyvalent metal exchange can be effected with solutions of salts of the metals such as their nitrates.

Our preferred catalysts are prepared by such ammonium ion exchange, followed by polyvalent metal cation exchange, of an alkali metal faujasite, such as sodium type Y zeolite, having a SiO$_2$/Al$_2$O$_3$ molar ratio in the range of 4.0 to 5.0. Cerium and dyprosium exchanged catalysts have exhibited superior results. The catalysts of this invention when employed with isobutane and butene-2 feeds produce a predominantly saturated product in which the TMP/DMH$_x$ ratio will be greater than 7. Commercial H$_2$SO$_4$ alkylates have TMP/DMH$_x$ ratios between 3/1 and 6/1.

Quantitative studies of the activation of "equilibrated" highly ammonium-exchanged sodium Y zeolite and cerium exchanged, NH$_4$Y have shown that in our preferred catalysts even after activation water can be evolved from the catalyst upon ignition at 1800° F. This water is sometimes called "bound" or "combined" or "complexed" water to distinguish from that loosely held water which is readily evolved from the exchanged zeolite upon initial drying thereof. Equilibrated zeolite is a zeolite which has been exposed to air of about 50% relative humidity at about 68° C. for about 12 hours.

In carrying out a continuous alkylation process with a zeolite catalyst, important consideration must be given to the alkylate yield as a function of catalyst age. For example, during initial periods in a batch alkylation process, the alkylate yield per olefin charged reaches 80 to 100% of the theoretical yield; however, subsequently, the alkylate yield declines rapidly by 50 to 70% relative to the theoretical yield. The decline in the alkylate yield is primarily due to the buildup of hydrocarbonaceous deposits and/or coke on the catalyst surface, decreasing the surface area and hence preventing the desirable catalytic effect. As such, it is also necessary in order to maintain superior alkylate yield and superior economic performance to determine a mean time in which the catalyst should be in contact with the reactants, and also a mode of regeneration which will enable one to reuse the catalyst while maintaining substantially similar properties.

In accordance with the above considerations, it has been determined that the time of relatively stable alkylation before serious deactivation occurs is approximately 60 hours for the desired catalysts as hereinbefore disclosed. Therefore, by allowing an initial reaction period of less than 60 hours and by continually withdrawing aged catalyst thereafter, we can maintain a superior yield of alkylate. Specifically, it has been found, based on desired product yield and economic considerations, that by allowing for an initial catalyst startup period, i.e., initial contact of feed and catalyst at process conditions, of approximately 50 to 55 hours prior to beginning continuous active catalyst feeding and removal at equal rates, superior results are obtained. Since the aged catalyst will be intermixed with liquid feed and products, it will have to be separated therefrom prior to regeneration. It should be noted that there is no criticality as to the rate of feeding or withdrawal of catalyst as long as the rates are substantially equal. It must be determined, of course, how much catalyst is actually being removed since the withdrawn stream contains hydrocarbon and catalyst. As a preferred mode of operation, the catalyst stream can begin to be fed and withdrawn once the alkylation reaction reaches a relatively steady product state as aforedescribed. In this manner, the reactants will always be in contact with substantially active catalyst, and the product yield will not be affected by a deactivated catalyst. As will be noted, removal of the liquid contents is carried out at a relatively slow rate since the catalyst itself has a long, useful life, and rapid withdrawal is not necessary.

After removing the small stream of reactor contents including catalyst, the stream is fed to a separator to separate the used catalyst from the accompanying hydrocarbon. Separation can be carried out by any means well known in the art for separating dispersed solids from a liquid, such as by settling or centrifuging. The separated hydrocarbon material can be ultimately separated again into reactant and product components and redistributed to their appropriate streams.

The separated catalyst is then fed to a regenerator for removal of carbonaceous deposits. The mode of regeneration must be governed by practical limitations due to the highly combustible product formed by the alkylate reaction which is also present as hydrocarbonaceous deposit. That is to say, the general method of removing hydrocarbonaceous deposits in the petroleum industry is by regeneration with air at high temperatures. However, since the deposits contain combustible alkylate, regeneration with an oxygen environment is too dangerous. Therefore, the regeneration processes applicable herewith consist of stripping the deposit with an inert gas such as helium, an inert sorbate, or mixtures thereof in any proportions at temperatures from alkylation temperature upward; i.e., temperatures in the range of 25° to 600° C., preferably 60° to 400° C. The term "sorbate" refers to a compound which is sorbed onto the surface of the catalyst replacing the deposits thereon. The operable sorbate regenerants comprise any compound which can be held by the catalyst but which is removable by heating at a practical, attainable temperature. Such sorbates include $NH_3$, $SO_2$, $CO_2$, fluorohydrocarbons, and amines. As a further alternative, following the regeneration with the inert gas or sorbate, combustive regeneration with an oxygen-containing gas such as air may take place at temperatures not exceeding 600 °C.

As a further condition to the reuse of the regenerated catalyst, it must be rehydrated at controlled conditions when the catalyst is regenerated at temperatures above that employed for the original activation of the catalyst. For example, a catalyst originally activated at 400° C. and having a small but critical water content will contain less water after regeneration at 500° C. In such a case, rehydration is necessary. By controlled conditions, we means subjecting the regenerated catalyst to an inert gas mixture or air containing 5 to 10% by weight water at temperatures below said regeneration temperature. Following rehydration, the catalyst is reactivated at the same conditions and in the same manner used for activating fresh catalyst: for example, subjecting the catalyst to inert gas or air at a temperature of about 400° to 450° C.

Of further import, when a sorbate such as ammonia is used during the regeneration, it is necessary to remove from the catalyst surface, as by purging with inert gas and/or steam at temperatures generally in the range of 100° to 300° C., as much sorbate as is possible to remove after regeneration. Otherwise, the sorbate could act as a poison toward alkylation or could be rapidly burned if air contacts the catalyst.

Figure 2:
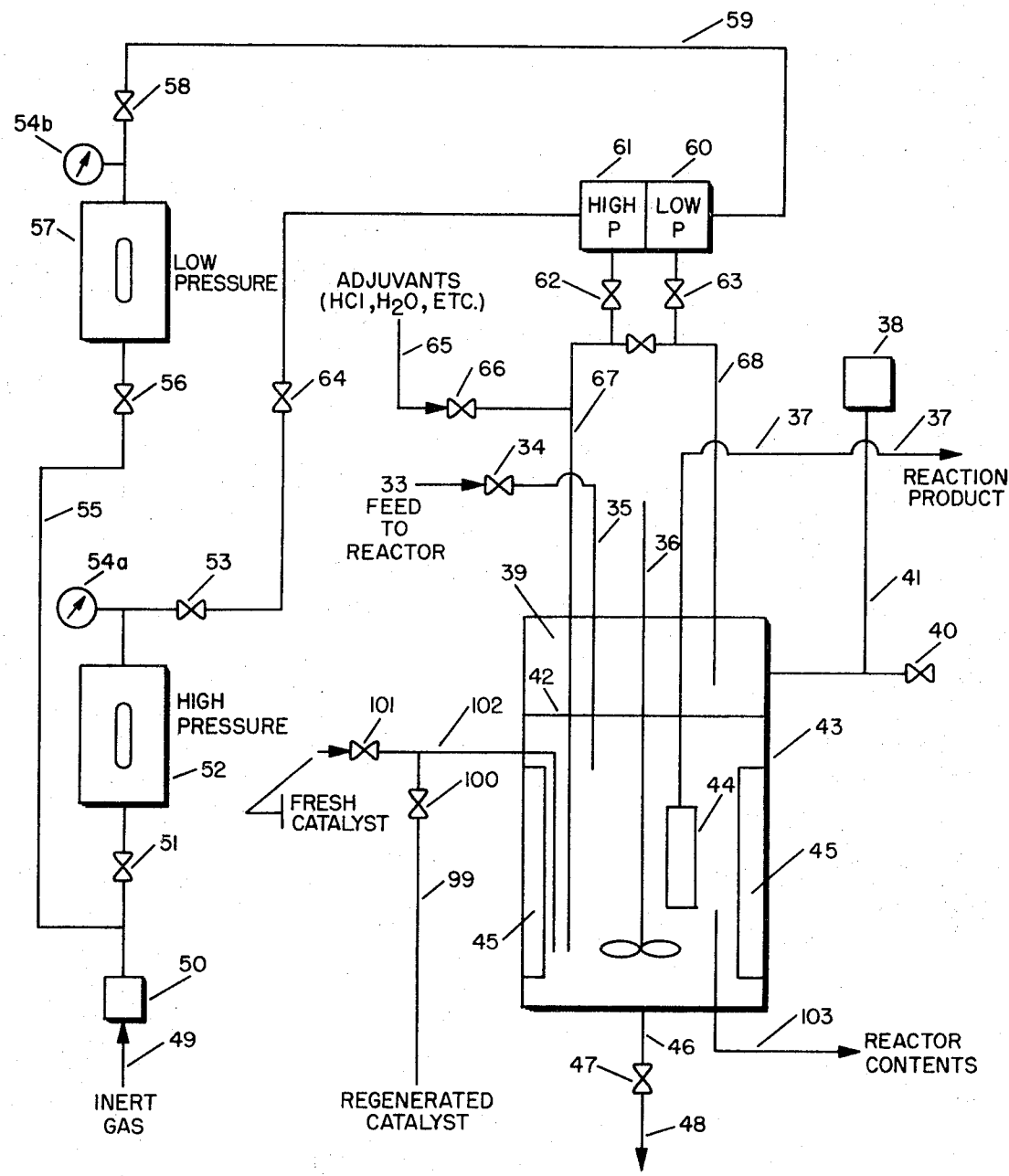
Figure 3:
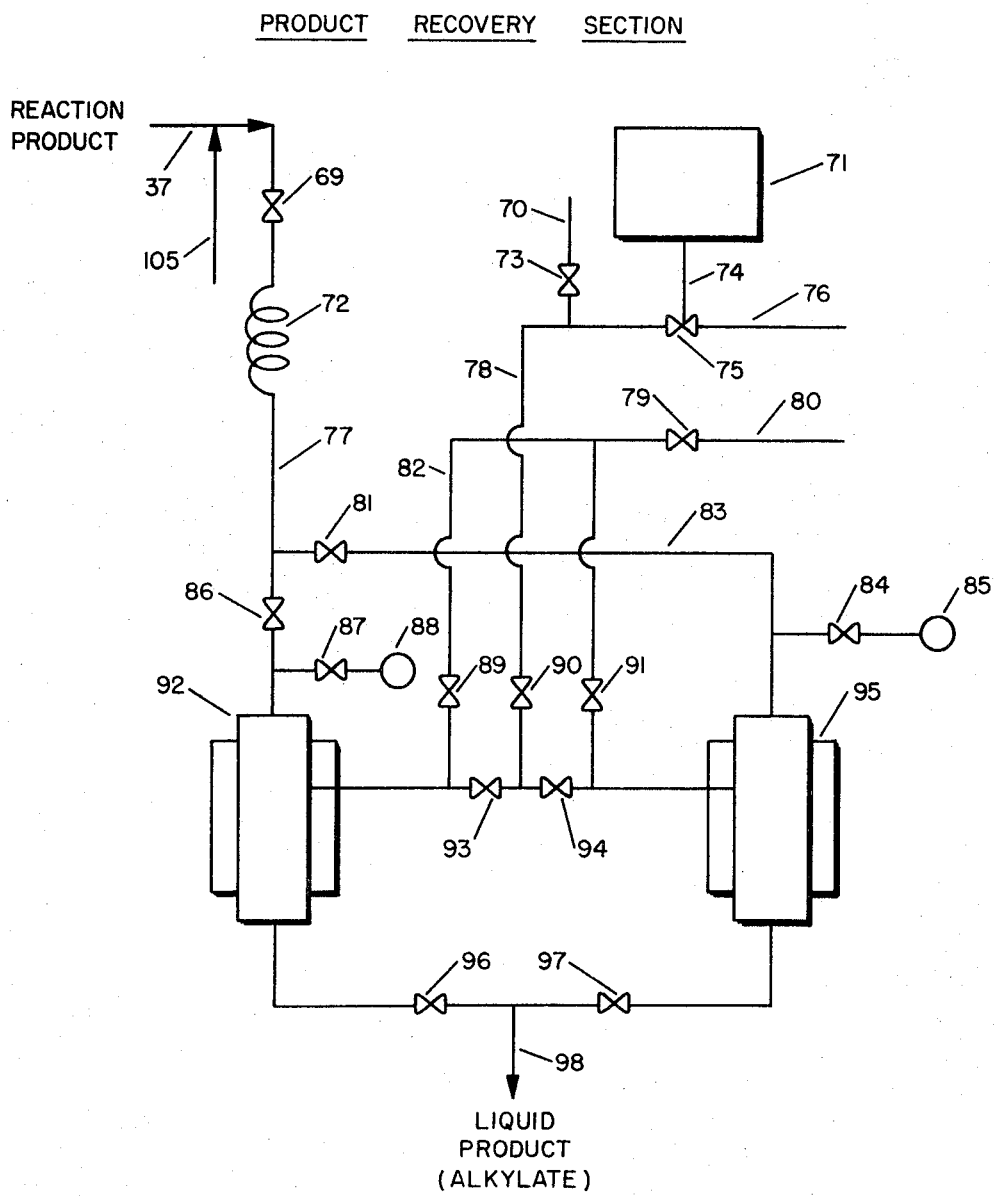
Figure 4:
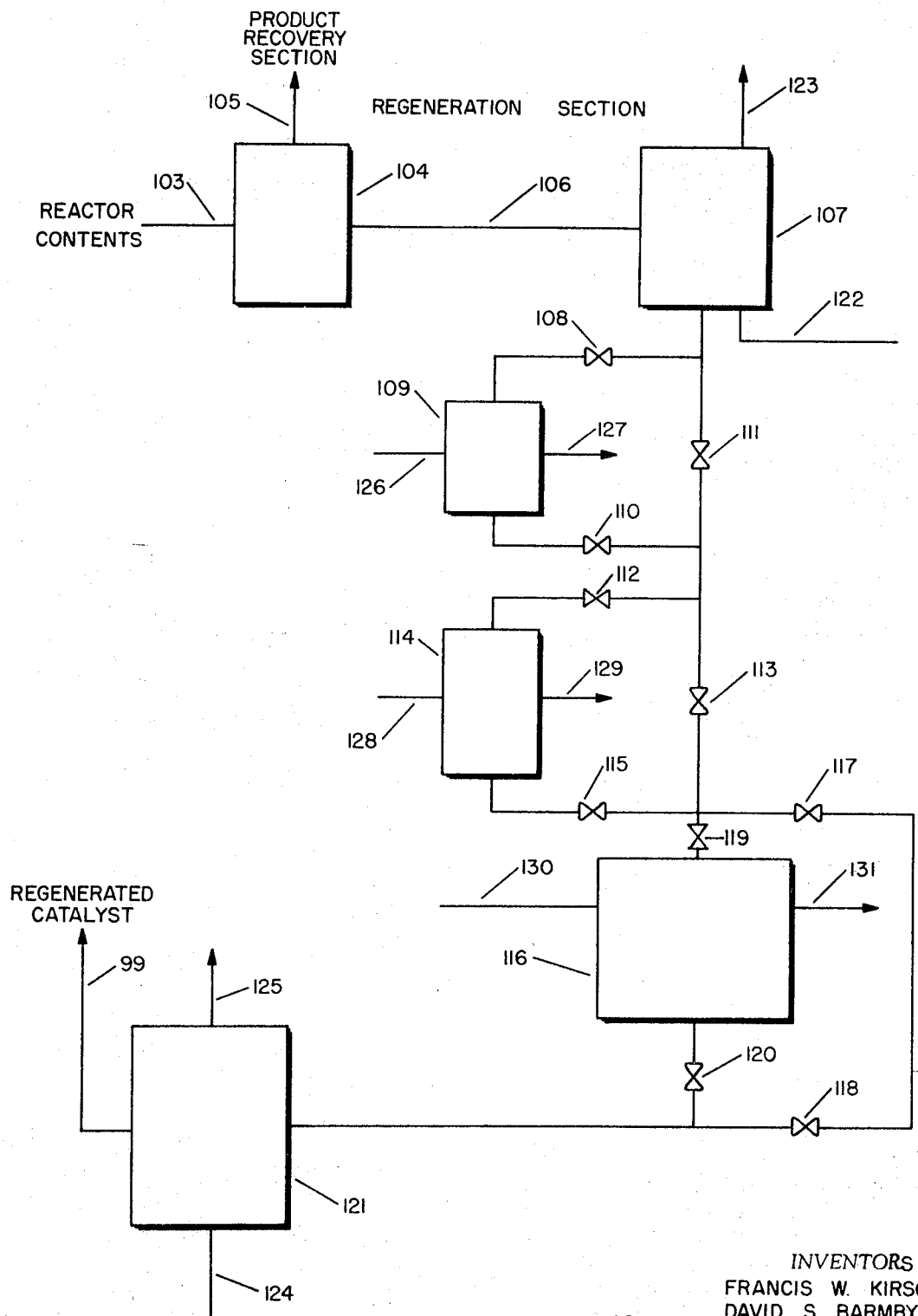

For a more complete description of the continuous process of this invention, reference should be made to the accompanying figures illustrating our continuous stirred reactor system wherein:

FIG. 1 represents the feed section;
FIG. 2 represents the reactor section;
FIG. 3 represents the product section; and
FIG. 4 represents the regeneration section.

As shown in FIG. 1, a valving arrangement at the top of the mixing vessels 17 and 18 allows feed paraffin 1 or feed olefin 3 to be placed in either vessel 17 or vessel 18 from either the top or the bottom of the vessel. For example, paraffin can be introduced through the bottom of vessel 17 by closing valves 9, 12, 19 and 23 and opening valves 4, 8, and 21. Then, feed olefin 3 is transported to vessel 17 by closing valves 4, 11, 12, 14, 19, 13, and 23 and opening valves 7, 8, 9, 10, and 21. Alternately, the mixing of the incoming feed olefin and feed paraffin can be effected by means of an inline mixer; however, for precise control of the reactant proportions and to insure intimate admixing of paraffin and olefin, we prefer that a substantial amount of paraffin admixed with olefin be maintained in a stirred mixing vessel as vesels 17 and 18.

Similarly, by sequencing the position of the valves, the feed paraffin and the feed olefin can be introduced in any desired pattern. One sequence of placing feed paraffin and feed olefin in vessel 17 is to allow feed paraffin to enter vessel 17 to a level $a$. Sufficient feed olefin is then brought into vessel 17 to produce a volume of paraffin-olefin admixture represented by level $b$. The remainder of the required paraffin feed is added to vessel 17 until the level of the total feed mixture is at $c$. Such a sequence of paraffin-olefin-paraffin addition allows for better internal mixing of the reactants in vessel 17. In addition, uniform mixing is insured by mixing devices 15 and 16, such as turbine blade rotary mixers. We have also found that additional mixing can be accomplished by bringing the inert gas head into the bottom of the mixing vessel as through valve 21 rather than into the top of the vessel as through valve 12. It should, of course, be noted that it is not a critical limitation that the feeds be premixed since they can be fed directly to the reactor individually as long as the rates of each feed are properly controlled. However, premixing of the feeds is preferred since the reaction is beneficially effected by intimate contacting of the feeds.

It is generally preferable to introduce feed components to the mixing vessels in a number of alternate portions (except when the feed components are simultaneously proportioned into an inline mixer) to insure uniform mixing. Similarly, sequencing of valves can be used to fill vessel 18 while the mixture in vessel 17 is being fed to the reactor 43 (FIG. 2). In order to use vessel 17, regardless of whether vessel 18 is being filled or not, pressure, as by inert gas 2 (e.g., nitrogen), is imposed upon the liquid in vessel 17, as by closing valves 12, 19, and 21 and opening valve 5. Normally, the nitrogen head is allowed to build up until the pressure in the mixing vessel is about 50 p.s.i. less than the pressure in the reactor 43.

In order to allow a mixed paraffin-olefin feed to enter the reactor 43, the nitrogen head is imposed upon vessel 17 and valve 19 is opened. A constant head pressure on vessel 17 allows the pump 31 to pump the mixed feed through line 33 to the reactor at a constant and desired rate.

When valve 19 is open, the feed mixture passes through a microfilter 24 which protects the pump and meters from damage caused by foreign particles, then through a high pressure rotometer 29 which serves as a flow indicator. The feed can then enter the pump 31 when valve 30 is open; and when valve 32 is open and 34 closed, the feed is pumped into the reactor 43. In the event of a pump failure, valves 30 and 32 may be closed, needle valve 34 opened, and the nitrogen head increased sufficiently to allow the feed to flow through line 35 to line 33 and then to the reactor 43.

FIG. 2 illustrates the reactor section comprising a continuous stirred reactor vessel and the associated lines and valving required for introducing feed and catalyst, removing reaction products and reactor contents, and for operating the differential pressure cell which is used for liquid level control. The reactor also contains heat transfer and control means (as a water jacket and electrical heaters, not shown) for maintaining the desired reaction temperature. The paraffin-olefin feed from line 33 enters the reactor 43 through valve 34 and line 35. To insure maximum olefin dilution, we prefer that the liquid feed be allowed to enter below the reactor liquid level 42 and in the vicinity of the mixing means 36. Active catalyst is fed to the reactor through line 102 which may be fresh catalyst passed through valve 101, regenerated catalyst from line 99 through valve 100, or a mixture of both.

The liquid level is controlled by a differential pressure cell, hereinafter DP cell, having a high pressure section 61 and a low pressure section 60, the differential pressure being in the range of 5 to 50 inches of water column. Inert gas 49 enters the DP cell through an inline filter 50 from which it diverges through meter 52 to the high pressure section 61 and through meter 57 to the low pressure section 60. That is, for the high pressure section, valve 51 is open, allowing the inert gas stream to flow through the high pressure meter 52 through open needle valve 53 and valve 64 into the high pressure side 61 of the DP cell, then through valve 62 into a line 67 which leads below the liquid level 42 in the reactor. Pressure gauges 54a and 54b indicate the pressure in the high pressure side and the low pressure side, respectively. Other pressure gauges, thermometers, and analytical devices can be advantageously incorporated into the four sections comprising the apparatus of FIGS. 1, 2 3, and 4; however, for simplicity, such devices are not shown in the figures.

The inert gas can also be diverted through valve 56 to the cell must travel from the bottom of line 67, which must low pressure side 60 of the DP cell and then through valve 63 and line 68 to the vapor space above the liquid level 42 in the reactor. In operation, the DP cell senses a differential pressure which is equal to the height of liquid through which the inert gas from the high pressure side of the cell must travel from the bottom of line 67, which must be below the liquid level, to the vapor space 39. The difference between the pressure of the high side 61 and the pressure of the low side 60 of the DP cell is approximately equal to the pressure required to push a bubble of gas through the height of the liquid. Since the DP cell measures the mass of a column of fluid (pressure) and not the volume, its measurement is independent of temperature; and although at several temperatures the actual level of the liquid will vary somewhat, the mass of the volume of liquid above the opening line 67 can be maintained at a constant value regardless of the temperature and pressure of the reactor.

The nitrogen or other inert gas which is introduced through the DP cell can be vented through a valve system 40, which can consist of an Annin control valve (a spline-type, highly sensitive metering device) and a block valve ahead of the Annin valve. The Annin valve can be actuated by a pressure controller 38 in order to maintain a constant pressure in the vapor space of the reactor.

Catalyst-free reaction mixture (FIG. 3) is removed from the reactor via line 37 through valve system 69, which can consist of an Annin valve and a hand-block valve ahead of the Annin valve. The liquid reaction mixture is separated from the suspended catalyst particles by means of a submerged screen 44 and is withdrawn from the reactor through line 37. Although screen plugging is not a frequent occurrence, the screen can be back-flushed with nitrogen if plugging occurs. This nitrogen back-flush can enter the reactor through line 37 and the excess nitrogen vented through valve system 40 in order that the reactor pressure is maintained constant. This flushing can be effected while the catalyst particles are maintained in suspension and the reaction mixture is maintained in contact with the catalyst particles. In order to effectuate the continuous process with respect to the used catalyst, reactor contents including catalyst are removed from the reactor via line 103 through a metering-type valve system not shown and are passed into the regeneration section of FIG. 4. The valve system included herein would meter the amount of catalyst being removed in the stream. In the event that it is desired to drain the entire contents of the reactor, this can be accomplished through line 48, flush valve 47, and line 46. For example, if deposit builds up on the reactor baffles 45, the reaction mixture can be dumped by opening valve 47, and then cleaning materials can be pumped into, and removed from the reactor through the same valves and lines.

The gases removed via valve 40 can be sent to a gas meter which can also contain devices for chemical analysis or sampling. For example, the gases so removed can contain HCl from the halide adjuvant. The HCl concentration in the vapor space is preferably maintained at a constant partial pressure, as by adjusting the quantity of adjuvant which enters the reactor via line 65, valve 66, and line 67. Such adjuvants can also be introduced into the reactor if they are directly added to the paraffin-olefin feed in the mixing vessels 17 and 18.

The catalyst-free liquid reaction product comprising $C_5^+$ "alkllate," unreacted feed isoparaffin, some $C_5^-$ paraffin product, and usually a small amount of unreacted feed olefin is removed from the reactor via line 37 and passes through valve 69, where the pressure is reduced from reactor pressure to 25 p.s.i. or less, to the condenser 72. The condensed liquid and noncondensed gas, e.g., feed isoparaffin, and inert gas, e.g., nitrogen, pass through valve 86 into vessel 92 or, alternately, through valve 81 to vessel 95. We prefer to have two such collecting vessels in order that product can be collected in one vessel while product is removed from the other vessel. The liquid product removed from these vessels can be transported to product storage tanks or to a means for blending the alkylate with other gasoline components in order to make a blended gasoline product which can be transported to a stabilizer and then to storage area or to tank trucks, etc.

In the product recovery section illustrated in FIG. 3, the liquid produced by condensation of gaseous products in condenser 72 and uncondensed gases pass through line 77 and valve 86 (valve 81 is closed) and enter vessel 92, which is maintained at a temperature and pressure such that liquid alkylate can be removed via valve 96 through line 98 (valve 97 is closed) to tank trucks, a blending area, storage tanks, etc. Uncondensed gases, which consist primarily of unreacted feed isoparaffin, leave vessel 92 via valves 93, 90, and 75 (valves 94, 89, and 73 are closed) and can be passed to means for gas purification and separation 71, or, under some conditions, can be recycled to the reactor or to the mixing vessels via line 76 or via valve 73 and line 70. Minor amounts of the halide promoter which may be present in the reaction product can be removed as by means of an adsorbent which can be between valve 69 and the condensor 72, or at any other appropriate location in the product recovery section. When the halide promoter is a readily distillable gas such as HCl or methyl chloride, it can be removed from the reaction product by an intermediate condensation.

Adjuvants such as tertiary butyl chloride can be added either directly to the reactor as by line 33, valve 34, and line 35 or to one of the feed components such as the isoparaffin or to the paraffin-olefin mixer in the mixing vessel 17 or 18; however, in the event that the promoter can react with the microfilter 24 cause corrosion in the pump 31, it is preferred that the adjuvant be added at some point after the pump as by line 65, valve 66, and line 67 (the high pressure side of the DP cell). Thus the promoter becomes dispersed in the flowing nitrogen from the high pressure side of the DP cell and passes into the reactor below the liquid level and bubbles up through the reactor contents.

The reactor contents in the slipstream 103, after leaving the reactor, are passed into the regeneration section, depicted in FIG. 4. The reactor contents, including the catalyst, are first fed into a separator 104. As aforementioned, the separator can be any type well known in the art. The separated accompanying hydrocarbon, which consists mainly of alkylate reaction product and unreacted feed isoparaffin, is then passed via line 105 to join in with the primary reaction product line 37. The separated catalyst then passed by line 106 to the regenerator 107. Within the regenerator, the coked catalyst is subjected to an inert gas or sorbate via line 122 which tends to strip the carbonaceous deposit from the surface of the catalyst. As aforementioned, the temperature in the reactor is generally maintained at a temperature in the range of 25° to 500° C. The regenerant stream exits via line 123.

Depending upon the mode of regeneration and the temperature maintained in the regenerator, the regenerated catalyst can then be subjected to various secondary processes. For example, if an inert gas such as helium is employed for the regeneration and the temperature is maintained below that temperature used for initial activation of the fresh catalyst, then the only necessary subsequent step in the process is the reactivation of the catalyst. As shown in the schematic, this can be accomplished by closing valves 108, 110, 112, 115, 119, and 120, opening valves 111, 113, 118, and 117, and allowing the regenerating catalyst to pass directly into the activator 121 where the catalyst is subjected to an inert gas or air 124 at activation temperatures in the range of 400° to 450°

C. The activated, regenerated catalyst leaves the zone via line 99 and can then be recombined with fresh catalyst being fed to the reactor, while the activating medium leaves via line 125.

Other possibilities following the regeneration include purging the sorbate where such is used, a second regeneration with air if so desired, and the rehydration of the catalyst where regeneration temperatures exceeded the original activation temperatures. These steps can be carried out individually or in combination as desired. For example, if the regeneration was carried out above the activation temperature with a sorbate such as ammonia, it would be desirable to purge the sorbate and rehydrate the catalyst. As such, following the regeneration valve 111 would be closed, valves 108 and 110 would be opened, and the regenerated catalyst would be allowed to pass through the purging apparatus 109. The purge stream enters and leaves through lines 126 and 127, respectively. Subsequently, with valves 111, 112, 115, 117, and 118 closed and valves 113, 119, and 120 open, the purged catalyst would be rehydrated in the rehydration zone 116 at temperatures less than said regeneration temperature. The rehydration stream, an inert gas mixture or air containing 5 to 10% by weight water, is introduced in line 130 and leaves via line 131. The catalyst would then be fed to the activating means 121.

Further, if it is desired that the catalyst be subjected to a second regeneration by air, then an air regeneration zone 114 is provided. Passage of the catalyst into this zone is accomplished by opening valves 112 and 115 and closing valve 113. The air enters and leaves through lines 128 and 129, respectively.

In carrying out a mode of operation for the present invention, a $NH_4^+$ exchanged zeolite catalyst which has been activated and predried is charged under a nitrogen blanket into a stirred reactor system similar to that represented in FIG. 2 containing two six-member flat-blade turbines. Immediately after charging the activated catalyst, sufficient liquid isobutane is added under nitrogen pressure to the reactor to bring the contents up to the desired liquid operating level; such desired level is generally 75% of the reactor volume. It should be noted that the amount of liquid paraffin which can be added is variable and can be merely enough to suspend the catalyst in solution or can be sufficient to reach the desired operating liquid level. The temperature and pressure are adjusted to run conditions of approximately 80° C. and 250 p.s.i., and the agitator is started such that the zeolite is suspended in the substantially liquid isobutane.

An isobutane-butene feed is then blended in the feed preparation section. A normal charge for a gallon reactor would consist of 800 ml. isobutane, 65 ml. butene-2, plus an additional 1335 ml. isobutane which gives approximately a nominal 30:1 isobutane-olefin molar ratio. The same charge is prepared in a second feed vessel so that during a continuous run there is no delay in feeding the reactor. The charge blend is then pumped to the reactor at a rate of approximately 15 to 25% reactor volume per hour, and by means of a dip tube the liquid feed is charged near the bottom of the reactor immediately below the lowest turbine. At this rate range and catalyst presence of approximately 10% of hydrocarbon weight, the mean residence time is in the range of about 0.3 to 0.4 hour. A reaction product stream free from catalyst is simultaneously withdrawn at the same rate. The reactor level is maintained through the use of the differential pressure controller. An adjuvant such as anhydrous HCl is carried into the reactor via the nitrogen dip tube of the high pressure differential pressure cell. The adjuvant is generally added in the ratio of $1 \times 10^{-5}$ to $1 \times 10^{-1}$ mole per mole of $C_4$–$C_6$ isoparaffin reactant. A pressure control with its sensing element in the reactor vapor space is employed to maintain constant reactor pressure.

As previously noted, the alkylation reaction begins to take place immediately; however, since initially only a minor amount of olefin is present, the reaction product stream withdrawn is diluted and contains only a minor amount of alkylate. The reaction is allowed to continue with a constant feeding of reactants and withdrawal of products, and after a period of approximately 6 to 12 hours the product stream contains at least 100% of alkylate based on the weight of olefin charge, wherein the theoretical yield is 204% of olefin charge. This is in accordance with the previous discussion relating to the carbonium ion buildup and the mean contact time. Through the use of a screen on the withdrawal line, catalyst is prevented from exicting with the reactor products. Following removal, the reaction product is fed to the recovery section where unreacted feed paraffins and olefins are separated and the liquid alkylate prdouct is recovered.

Th initial catalyst is allowed to remain intact in the reactor until a steady high yield of alkylate is obtained which, as aforedescribed, will generally be about 6 to 12 hours, at which time a slipstream of reactor contents including catalyst is begun to be withdrawn and active catalyst added at equal rates. Due to the long life of the catalyst, a slow rate of withdrawal in the range of 0.5 to 10.0 wt. percent of catalyst in the reactor per hour can be employed. Once withdrawn, the reactor contents are fed to the regeneration section where the catalyst is separated from the reaction feed and products. The separated catalyst is then regenerated with an inert gas or sorbate, or combinations thereof, as aforedescribed in the controlled temperature range. As an example of the regeneration, an $NH_4 \cdot CeY$ catalyst was stripped at 80° C. with helium and equal volume mixtures of helium and ammonia and helium and carbon dioxide. The composition of the stripped material was compared with the last alkylate produced at 80° C. before stripping of the same catalyst. The results are shown in Table I.

TABLE I

| | TMP | $C_{10}^+$ | 2,3-DMB | 2-MP | 3-MP | Total $C_6$ |
|---|---|---|---|---|---|---|
| 80° C. alkylate | 41.8 | 16.8 | 1.0 | 0.2 | 11.8 | 13.0 |
| 80° C. stripped condensate: | | | | | | |
| He | 33.1 | 7.9 | 0.8 | 0.2 | 30.2 | 31.2 |
| He plus $NH_3$ | 28.5 | 0.4 | 1.0 | 0.1 | 39.9 | 41.0 |
| He plus $CO_2$ | 29.3 | 4.8 | 0.9 | 0.2 | 39.9 | 41.0 |

It should be noted that the increase in total $C_6$ is roughly twice the decrease in $C_{10}^+$; however, this is in agreement with the concept of $C_{12}^+$ cracking to $C_6$ at 80° C. Thus, it can be seen that the composition of the stripped condensate is closely related to that of the alkylate.

Following regeneration, the catalyst is possible subjected to the secondary treatments of purging, secondary regeneration, or rehydration and is then reactivated and can be fed back to the reactor. The catalyst can be intermixed with fresh catalyst, or after sufficient regenerated catalyst buildup, it can be the sole active catalyst feed. As an indicia of our ability to reactivate the catalyst for continuous use, $NH_4CeY$ catalyst, which was composited from both long and short lived runs, was initially regenerated with helium at 400° C. for approximately two hours. Thereafter, the catalyst was air regenerated for two hours at 550° C., rehydrated at room temperature, and reactivated with air at 400° C. for two hours nad subsequently reintroduced, absent the presence of any fresh catalyst, into the continuous stirred reactor for the alkylation of isobutane and butene. The surface area of the regenerated catalyst was 808 m.²/g. and it had an ignition loss of only 2.74 wt. percent. The regenerated catalyst's life was 70–75% of the longest life found for a fresh catalyst and it maintained an average of approximately 85% theoretical yield of alkylate per olefin charged for the range of 0.8 to 3.8 olefin to catalyst charge on a weight to weight basis.

As a further aspect of the instant invention, it has been determined that superior economic results and product quality can be obtained when the instant process is carried out in a multiple-stage continuous stirred reactor. In such a reactor the amount of unreacted but recycled isoparaffin is drastically reduced, since where an M-stage reactor is employed the initial isoparaffin charge need only be 1/$M$th of its volume in a single-stage reactor and only 1/$M$th of the required amount of olefin in a single-stage reactor is charged to each stage. Thus, for example, a three-stage reactor would require 300 volumes of isobutane for a corresponding butene charge of 10 volumes. If all the butene reacts, excess isobutane going to stage 2 is 290 volumes wherein an additional 10 volumes of butene would be added. The effluent from stage 2 would be 280 volumes of isobutane which is charged to stage 3 along with 10 volumes of butene. Therefore, the amount of isobutane to be recycled from stage 3 is 270 volumes compared with 870 volumes if 900 volumes of isobutane and 30 volumes of butene were charged to a single-stage reactor.

Furthermore, it has been determined that in a single-stage reactor with a mean holding time of four hours, an average of 22.1% of the feed will be held in the reactor less than one hour, whereas for the same reaction in a two-stage reactor, only 9% of the feed will be held for less than one hour. Hence, the ultimate effect of a multiple-stage reactor will be to reduce the holding time required for a fixed amount of product and in essence allow a more efficient use of a given reactor volume.

We claim:

1. A continuous process for the preparation of an olefin-paraffin alkylate comprising
   (a) contacting $C_3$–$C_9$ monoolefin with $C_4$–$C_6$ isoparaffin and with a substantially anhydrous acidic crystalline alumino-silicate zeolite catalyst within a reactor, at a temperature below the critical temperature of the lowest boiling hydrocarbon reactant, at a pressure such that each of the reactants is at least partially in liquid phase, and wherein the monoolefin and isoparaffin are present in such proportions that the unreacted olefin in the reaction mixture is maintained at less than 12 mole percent, the molar ratio of isoparaffin to monoolefin being at least 15 to 1 and wherein a halide adjuvant containing bromine, chlorine or fluorine is present in solution in the reaction mixture in the ratio of $10^{-5}$ to $10^{-1}$ mole per mole of $C_4$–$C_6$ isoparaffin;
   (b) continuously introducing said $C_3$–$C_9$ monoolefin and $C_4$–$C_6$ isoparaffin and adjuvant in proportions so as to maintain the unreacted olefin in the reaction mixture at less than 12 mole percent and continuously withdrawing a reactor product stream free of catalyst, wherein said adjuvant, monoolefin and paraffin and product stream are being introduced and withdrawn, respectively, at the same rate;
   (c) allowing said catalyst to remain in contact with reactants until a steady, high yield of alkylate is obtained and then effecting constant withdrawal of a slipstream containing catalyst and a constant introduction of an active catalyst stream to the reactor, wherein said catalyst is being withdrawn and introduced at the same rate;
   (d) stripping carbonaceous deposits from the surface of said catalyst which was in said slipstream by subjecting it to a regenerant selected from the group consisting of an inert gas, an inert sorbate, or mixtures thereof at a regeneration temperature; and
   (e) activating said regenerated catalyst for reintroduction into said reactor.

2. A process as described in claim 1 wherein the isoparaffin and monoolefin are premixed to form a reactant feed stream.

3. A process as described in claim 1 wherein the mean residence time between the feed and catalyst is at least about 0.05 hour.

4. A process as described in claim 1 wherein the reaction takes place at a temperature in the range of from 25° to 200° C. and at a pressure in the range of from 150 to 450 p.s.i.

5. A process as described in claim 1 wherein said halide adjuvant comprises tertiary butyl chloride, carbon tetrachloride, HF, HBr, or HCl.

6. A continuous process for the preparation of an olefin-paraffin alkylate comprising
   (a) contacting $C_3$–$C_9$ monoolefin with $C_4$–$C_6$ isoparaffin and with a substantially anhydrous acidic crystalline alumino-silicate zeolite catalyst within a reactor, at a temperature below the critical temperature of the lowest boiling hydrocarbon reactant, at a pressure such that each of the reactants is at least partially in liquid phase, and wherein the monoolefin and isoparaffin are present in such proportions that the unreacted olefin in the reaction mixture is maintained at less than 12 mole percent;
   (b) continuously introducing said $C_3$–$C_9$ monoolefin and $C_4$–$C_6$ isoparaffin in proportions so as to maintain the unreacted olefin in the reaction mixture at less than 12 mole percent and continuously withdrawing a reactor product stream free of catalyst, wherein said monoolefin and paraffin and product stream are being introduced and withdrawn, respectively, at the same rate;
   (c) allowing said catalyst to remain in contact with reactants until a steady, high yield of alkylate is obtained and then effecting constant withdrawal of a slipstream containing catalyst and a constant introduction of an active catalyst stream to the reactor, wherein said catalyst is being withdrawn and introduced at the same rate;
   (d) stripping carbonaceous deposits from the surface of said catalyst which was in said slipstream by subjecting it to a regenerant comprising helium at a regeneration temperature in the range of 25° to 600° C.; and
   (e) activating said regenerated catalyst for reintroduction into said reactor.

7. A continuous process for the preparation of an olefin-paraffin alkylate comprising
   (a) contacting $C_3$–$C_9$ monoolefin with $C_4$–$C$ isoparaffin and with a substantially anhydrous acidic crystalline alumino-silicate zeolite catalyst within a reactor, at a temperature below the critical temperature of the lowest boiling hydrocarbon reactant, at a pressure such that each of the reactants is at least partially in liquid phase, and wherein the monoolefin and isoparaffin are present in such proportions that the unreacted olefin in the reaction mixture is maintained at less than 12 mole percent;
   (b) continuously introducing said $C_3$–$C_9$ monoolefin and $C_4$–$C_6$ isoparaffin in proportions so as to maintain the unreacted olefin in the reaction mixture at less than 12 mole percent and continuously withdrawing a reactor product stream free of catalyst, wherein said monoolefin and paraffin and product stream are being introduced and withdrawn, respectively, at the same rate;
   (c) allowing said catalyst to remain in contact with reactants until a steady, high yield of alkylate is obtained and then effecting constant withdrawal of a slipstream containing catalyst and a constant introduction of an active catalyst stream to the reactor, wherein said catalyst is being withdrawn and introduced at the same rate;
   (d) stripping carbonaceous deposits from the surface of said catalyst which was in said slipstream by subjecting it to a regenerant comprising ammonia or a mixture of ammonia and helium at a regeneration temperature in the range of 25° to 600° C. and wherein following the regeneration the ammonia is purged from the catalyst surface with an inert gas; and (e) activating said regenerated catalyst for reintroduction into said reactor.

8. A process as described in claim 1 wherein following regeneration the catalyst is subjected to rehydration at a temperature below said regeneration temperature with an inert gas or air containing from about 5 to 10% by weight water.

9. A process as described in claim 1 wherein the catalyst remains in contact with the reactants for at least 6 hours and less than about 55 hours.

10. The process of claim 1 wherein the pressure is in the range of 250–450 p.s.i.

11. The process of claim 6 wherein the pressure is in the range of 250–350 p.s.i.

References Cited
UNITED STATES PATENTS

| | | | |
|---|---|---|---|
| 2,832,812 | 4/1958 | Belden | 260—683.47 |
| 3,236,761 | 2/1966 | Rabo et al. | 252—455 Z |
| 3,367,885 | 2/1968 | Rabo et al. | 252—455 Z |
| 3,392,111 | 7/1968 | Napier et al. | 252—414 |
| 3,251,902 | 5/1966 | Garwood et al. | 260—683.43 |
| 3,390,101 | 6/1968 | Csicsery | 252—455 Z |
| 3,463,744 | 8/1969 | Mitsche | 252—455 Z |
| 3,464,929 | 9/1969 | Mitsche | 252—455 Z |
| 3,472,792 | 10/1969 | Vesely et al. | 252—455 Z |
| 3,549,557 | 12/1970 | Bolton et al. | 252—455 Z |

DELBERT E. GANTZ, Primary Examiner

G. J. CRASANAKIS, Assistant Examiner

U.S. Cl. X.R.

252—411; 260—683.47